US008819526B2

(12) United States Patent
Cho et al.

(10) Patent No.: US 8,819,526 B2
(45) Date of Patent: Aug. 26, 2014

(54) METHOD AND APPARATUS FOR RECOVERING BURST DATA LOSS BY DUPLICATING BLOCK CODE SYMBOLS

(75) Inventors: Jai Hyung Cho, Daejeon (KR); Sang Ho Lee, Daejeon (KR); Doug Young Suh, Daejeon (KR); Chul Keun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 46 days.

(21) Appl. No.: 13/809,090

(22) PCT Filed: Jul. 8, 2011

(86) PCT No.: PCT/KR2011/005024
§ 371 (c)(1),
(2), (4) Date: Jan. 8, 2013

(87) PCT Pub. No.: WO2012/005544
PCT Pub. Date: Jan. 12, 2012

(65) Prior Publication Data
US 2013/0111302 A1 May 2, 2013

(30) Foreign Application Priority Data

Jul. 8, 2010 (KR) .................. 10-2010-0065642
Apr. 12, 2011 (KR) .................. 10-2011-0033741

(51) Int. Cl.
*H03M 13/00* (2006.01)
*G11B 13/00* (2006.01)
*H04L 1/00* (2006.01)

(52) U.S. Cl.
CPC ............. *H04L 1/0041* (2013.01); *H04L 1/0045* (2013.01)
USPC ............................ 714/776; 714/752; 714/814

(58) Field of Classification Search
CPC ... H04L 1/0071; H04L 1/0057; H04L 1/0041; H04L 1/0045; H03M 13/09; H03M 13/2957
USPC ......... 714/776, 751, 752, 786, 787, 788, 789, 714/814, 731
See application file for complete search history.

(56) References Cited

U.S. PATENT DOCUMENTS 7,861,132 B1    12/2010 O'Donnell et al.
8,209,586 B2 *  6/2012 Vesma et al. .................. 714/762
(Continued)

FOREIGN PATENT DOCUMENTS

KR    10-0981500       9/2010
WO    2012/005544 A2   1/2012

OTHER PUBLICATIONS

International Search Report for Application No. PCT/KR2011/005024, 5 pages, dated Feb. 15, 2012.

*Primary Examiner* — Christine Tu
(74) *Attorney, Agent, or Firm* — Nelson Mullins Riley & Scarborough LLP; Anthony A. Laurentano, Esq.

(57) ABSTRACT

Provided is a method and apparatus for encoding and decoding in which block coding is applied. According to a method and apparatus for block coding encoding and decoding, a minimum quality seamless service may be provided by reliably recovering high importance data even though continuous data loss occurs in a wired and wireless transmission line. A transposed duplication calculation or a post duplication calculation may be performed with respect to the high importance data. Data of a predetermined lost time zone may be recovered by duplicated data of another time zone.

19 Claims, 8 Drawing Sheets

(56) References Cited

U.S. PATENT DOCUMENTS

| | | |
|---|---|---|
| 8,503,444 B2 * | 8/2013 | Suneya .................... 370/389 |
| 2003/0120983 A1 | 6/2003 | Vieregge et al. |
| 2008/0098284 A1 | 4/2008 | Wolfgang et al. |
| 2010/0223535 A1 | 9/2010 | Geng et al. |
| 2010/0254489 A1 * | 10/2010 | Citta ........................ 375/299 |
| 2012/0317461 A1 * | 12/2012 | Hwang et al. ............ 714/776 |

* cited by examiner

METHOD AND APPARATUS FOR RECOVERING BURST DATA LOSS BY DUPLICATING BLOCK CODE SYMBOLS

RELATED APPLICATIONS

This application is a 35 U.S.C. §371 filing of International Application No. PCT/KR2011/005024 which was filed on 8 Jul. 2011 and which claims priority to, and the benefit of, Korean Application Nos.: 10-2010-0065642, filed on 8 Jul. 2010 and 10-2011-0033741, filed 12 Apr. 2011. The contents of the aforementioned applications are hereby incorporated herein by reference.

TECHNICAL FIELD

Embodiments of the present invention relate to a method and apparatus for recovering data loss, and more particularly, to a method and apparatus for recovering burst data loss by duplicating a block code symbol.

BACKGROUND ART

When a terminal passes a propagation shadowing region, for example, a tunnel where a receiving channel status is poor, and the like, while radio data of a real-time streaming type such as a voice, an image, and the like is transmitted over a mobile communication network, a mobile broadcasting network, and the like, continuous data loss may occur whereby a temporary service disconnection may occur.

Various error correction schemes have been widely used as technology to overcome a degradation in the quality of service that may occur due to continuous data loss of a broadcasting receiving terminal.

An error correction scheme enables a receiving terminal to recover lost data by additionally generating parity data for error correction such as a forward error correction (FEC) and the like and by transmitting the parity data to the receiving terminal.

For example, in the case of a FEC technology for a standardized voice and image multimedia service, a transmitting server may generate a single FEC source block by collecting Internet Protocol (IP) packets carrying an encoded video, voice, character data, and the like, based on a symbol unit, and then may calculate FEC parity with respect to the collected data of the FEC source block. The calculated FEC parity data and an IP data packet may be independently transmitted via separate logic channels. When a partial loss of an IP packet is detected due to a transmission error and the like, the receiving terminal may employ a block coding error correction scheme of recovering the lost IP packet using the received FEC parity data.

However, the loss recovery capability of the aforementioned error correction schemes is generally in proportion to an amount of generated parity data.

When a large amount of data packets is lost due to a continuous burst loss and the like in a radio channel, a large amount of parity data may need to be transmitted together with data in order to prevent a service disconnection from occurring due to the continuous burst loss. To transmit the large amount of parity data together with the data may increase a transmission bit rate and decrease the coding efficiency.

In particular, in the case of a wireless data network with a limited available bandwidth, when a significantly large number of bandwidths are assigned to transmit parity data, a transmission bit rate may need to be reduced by decreasing the number of video stream services that can be provided, or by decreasing the quality of video service.

Accordingly, there is a need for a seamless service technology that may minimize a consumption of a bandwidth used for parity data transmission, and may continuously guarantee a streaming service even in a link outage circumstance and the like.

DISCLOSURE OF INVENTION

Technical Goals

An aspect of the present invention provides an encoding apparatus and method that may duplicate and thereby apply a block code symbol.

Another aspect of the present invention also provides a decoding apparatus and method that may recover a data loss using a duplicated block code symbol.

Technical Solutions

According to an aspect of the present invention, there is provided an encoding apparatus including: a low priority buffer; a high priority buffer; a priority classifier to receive a data stream in which an importance is indicated, to indicate time information in the data stream, and to classify the data stream into the low priority buffer and the high priority buffer based on the importance and thereby store the data stream; and a forward error collection (FEC) encoder to perform an encoding calculation for FEC parity data generation by fetching data of the same first time zone from each of the low priority buffer and the high priority buffer to thereby configure a FEC source block by, and by fetching, from the high priority buffer, data of a second time zone different from the first time zone to thereby add the fetched data to the FEC source block.

The second time zone may be a time zone ahead of the first time zone by an L time or a time zone behind the first time zone by the L time.

L may correspond to a maximum length of high importance data to be recovered from continuous burst loss.

Data of the low priority buffer and the high priority buffer may be buffered for a minimum of the L time.

The second time zone may be a time zone ahead of the first time zone by the L time and a time zone behind the first time zone by the L time.

The FEC encoder may delay data of the low priority buffer by the L time compared to data of the high priority buffer and thereby transmit the data.

The FEC encoder may indicate a block identifier in output data constituting a block and the FEC parity data. Data that is duplicated and is added to at least two blocks and has a high importance within the high priority buffer may be indicated using at least two block identifiers.

The FEC encoder may sequentially output the output data and the FEC parity data in which a block identifier is indicated.

The data stream may be a scalable video coding stream, data of the high priority buffer may be base frame data, and data of the low priority buffer may be enhancement frame data.

According to another aspect of the present invention, there may be provided a decoding apparatus including: a low priority buffer; a high priority buffer; a FEC buffer; a priority classifier to receive FEC data and a data stream in which an importance and a block identifier are indicated, to indicate time information in the data stream and the FEC data, to classify the data stream into the high priority buffer and the low priority buffer and thereby store the data stream, and to store the FEC data in the FEC buffer; and a FEC decoder to configure a FEC block and perform decoding based on data of the low priority data, data of the high priority data, and the FEC data. When lost data of a first time zone is detected, the FEC decoder may configure the FEC block by estimating the block identifier to be used for loss recovery using block identifier information of lossless data of the first time zone, by fetching all of lossless data corresponding to the estimated block identifier from the low priority buffer and the high priority buffer, and by fetching all of lossless FEC data corresponding to the estimated block identifier from the FEC buffer, and may perform FEC decoding by performing a FEC decoding calculation with respect to the FEC block.

The FEC decoder may configure the FEC block by estimating the block identifier of a second time zone different from the first time zone, by fetching all of lossless data corresponding to the estimated block identifier from the low priority buffer and the high priority buffer, and by fetching all of lossless FEC data corresponding to the estimated block identifier from the FEC buffer, and may recover the lost data by performing FEC decoding with respect to the FEC block.

The second time zone may be a time zone ahead of the first time zone by an L time or a time zone behind the first time zone by the L time.

L may correspond to a maximum length that the decoding apparatus desires to recover high importance data from continuous burst loss.

Data of the low priority buffer and the high priority buffer may be buffered for at least minimum of the L time. The FEC data of the FEC buffer may be buffered for the at least minimum of the L time.

Low importance data that is stored in the low priority buffer may be delayed by at least the L time compared to high importance data that is stored in the high priority buffer and thereby be transmitted. Data of the high priority buffer may be buffered for at least the L time.

The FEC decoder may configure the FEC block by further buffering the data stream and the FEC data for the L time to thereby fetch a block identifier of input data, and by fetching all of lossless data and FEC data corresponding to the fetched block identifier from the low priority buffer, the high priority buffer, and the FEC buffer, and may recover the lost data by performing decoding with respect to the FEC block.

The second time zone may be a time zone ahead of the first time zone by the L time and a time zone behind the first time zone by the L time.

According to still another aspect of the present invention, there is provided an encoding method including: receiving a data stream in which an importance is indicated; indicating time information in the data stream; classifying the data stream in which the time information is indicated into a low priority buffer and a high priority data based on the importance to thereby store the data stream; configuring a FEC source block by fetching data of a predetermined time zone from the low priority buffer and the high priority buffer; fetching, from the high priority buffer, data ahead of or behind the predetermined time zone by an L time to thereby add the fetched data to the FEC source block; calculating FEC parity data of the FEC source block; and outputting the FEC source block and the FEC parity data.

According to yet another aspect of the present invention, there is provided a decoding method including: receiving FEC data and a data stream in which an importance and a block identifier are indicated; storing the data stream by classifying the data stream into a low priority buffer and a high priority buffer, and storing the FEC data in a FEC buffer; configuring a FEC block based on data of the low priority data and the high priority data and the FEC data; configuring the FEC block by fetching L-time ahead data or L-time behind data from the low priority buffer, the high priority buffer, and the FEC buffer; and performing a FEC decoding calculation with respect to the FEC block.

Effect of the Invention

According to embodiments of the present invention, there is provided an encoding apparatus and method that may duplicate and thereby apply a block code symbol.

Also, according to embodiments of the present invention, there is provided a decoding apparatus and method that may recover a data loss using a duplicated block code symbol.

BEST MODE FOR CARRYING OUT THE INVENTION

Figure 1:
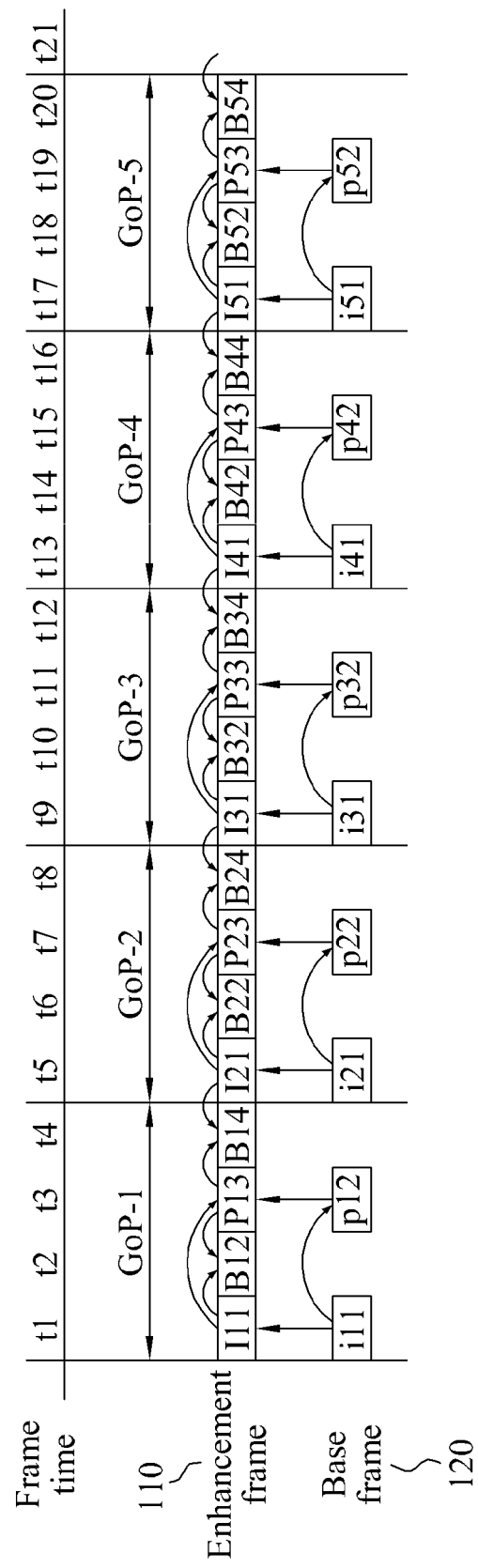
FIG. 1 is a diagram illustrating a frame reference structure of a hierarchical scalable video coding (SVC) stream according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a frame reference structure of a hierarchical scalable video coding (SVC) stream according to an embodiment of the present invention.

An SVC technology standardized by Joint Video Team (JVT) of the International Telecommunication Union Telecommunication Standardization Selector (ITU-T) and International Organization for Standardization/International Electrotechnical Commission (IOC/IEC) Joint Technical Committee (JTC) 1 corresponds to a method of coding an image by configuring a video frame using a stream including a low bitrate of base frames and hierarchical enhancement frames that refer to the base frames.

FIG. 1 shows a reference relationship between frames of a hierarchical video stream that is separated into two layers using the SVC technology.

Referring to FIG. 1, base frames 120 having a low bitrate and having a high importance may be independently decoded. However, enhancement frames 110 may not be decoded without using base frame information.

Accordingly, even though the enhancement frames 110 are lost, a low quality image may be played back by decoding only the base frames 120. However, when data of the base frames 120 is lost, none of the enhancement frames 110 that directly or indirectly refer to the lost base frames 120 may be decoded.

When all of the base frames 120 and the enhancement frames 110 that refer thereto are decoded, a normal quality video image may be played back.

Accordingly, in the SVC technology, the base frame 120 having a low bitrate may have a highest importance.

As described above, in a hierarchical video coding method in which a relative importance of data is separated, the base frame 120 may become further robust against loss compared to the enhancement frame 110 by adding a relatively large ratio of parity data to the base frame 120 having a low bitrate and a high importance.

However, even in the above method, a recovery capability may be limited in proportion to an amount of parity data that is added and thereby is transmitted. Accordingly, to prepare for a link outage circumstance and the like that may occur where data loss continuously occurs, a large amount of parity data may need to be transmitted.

Figure 2:
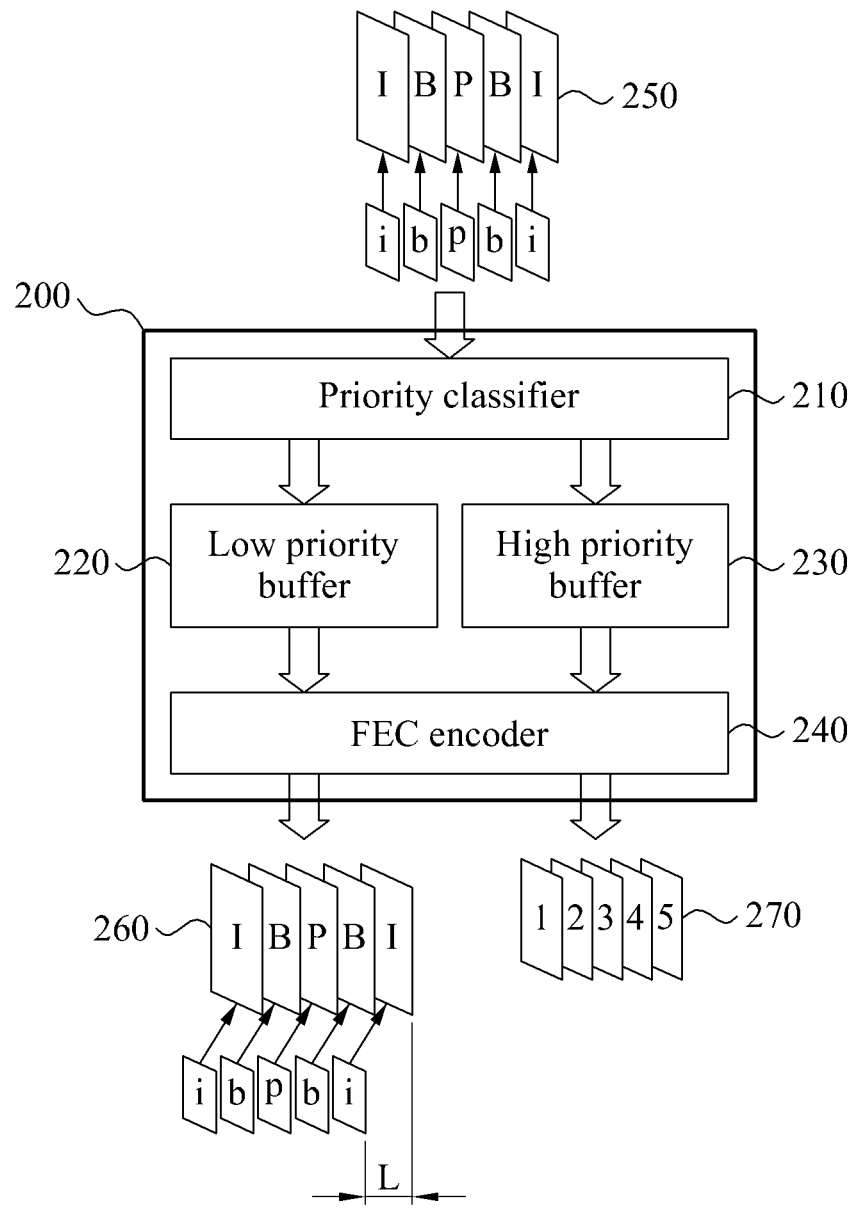
FIG. 2 is a diagram illustrating a configuration of a block coding encoding apparatus according to an embodiment of the present invention.

FIG. 2 is a diagram illustrating a configuration of a block coding encoding apparatus 200 according to an embodiment of the present invention.

The block coding encoding apparatus 200 may include a priority classifier 210, a low priority buffer 220, a high priority buffer 230, and a forward error correction (FEC) encoder 240.

The priority classifier 210 may receive, from an outside, a data stream 250 in which an importance is indicated.

The data stream 250 may include an I frame, a B frame, and a P frame.

The data stream 250 may be separated based on a priority. The data stream 250 may include low priority data having a low importance and high priority data having a high importance.

For example, the data stream 250 may be a hierarchically separated SVC stream. High importance data may be base frame data, and low importance data may be enhancement frame data. The data stream 250 may be a multimedia stream in which a voice and an image are mixed, and high importance data may be a voice stream. The data stream 250 may be a three-dimensional (3D) stream in which an image is separated into a left image and a right image, and high importance data may be data of one image having a high importance.

The priority classifier 210 may indicate time information in the received data stream, and may classify the data stream into the low priority buffer 220 and the high priority buffer 230 based on an importance and thereby store the data stream.

For example, low importance data within the data stream may be stored in the low priority buffer 220. High importance data within the data stream may be stored in the high priority buffer 230.

The FEC encoder 240 may fetch data from each of the low priority buffer 220 and the high priority buffer 230. Here, high importance data that is fetched from the low priority buffer 220 and low importance data that is fetched from the high priority buffer 230 may be data of the same first time zone.

The FEC encoder 240 may configure a FEC source block for a FEC calculation using the fetched data.

The FEC encoder 240 may further fetch, from the high priority buffer 230, high importance data corresponding to a second time zone different from the first time zone, and may add the fetched data to the FEC source block.

The FEC encoder 240 may perform an encoding calculation for FEC parity data generation using the FEC source block.

Accordingly, high importance data that is stored in the high priority buffer 230 may be included in a FEC block twice. That is, the encoding calculation may be performed in such a manner that data having the high priority is included in the FEC block twice.

The second time zone may be a time zone ahead of the first time zone by an L time, which is referred to as a "post duplication calculation".

The second time zone may be a time zone behind the first time zone by the L time, which is referred to as a "transposed duplication calculation".

Also, the post duplication calculation and the transposed duplication calculation may be performed together. That is, the second time zone may be a time zone ahead of the first time zone by the L time and a time zone behind the first time zone by the L time. That is, the FEC encoder 240 may further fetch, from the high priority buffer 230, high importance data of the time zone ahead of the first time zone by the L time and high importance data of the time zone behind the first time zone by the L time, and may add the fetched data to the FEC source block.

Here, a time value L may be a maximum length of high importance data to be recovered from continuous burst loss. That is, to configure the FEC block, data of the low priority buffer 220 and the high priority buffer 230 may be buffered for at least minimum of the L time.

The FEC encoder 240 may indicate a block identifier in data constituting a block and the calculated FEC parity data. Therefore, data that is duplicated and thereby is added to at least two blocks and has a high importance may be indicated using at least two block identifiers.

The FEC encoder 240 may sequentially output data 260 in which the block identifier is indicated, and FEC parity data 270 in which the block identifier is indicated.

The FEC encoder 240 may be configured by applying an interleaving method.

For example, the FEC encoder 240 may delay low importance data of the low priority buffer 220 by the L time compared to high priority data of the high priority buffer 230 and thereby transmit the data. Accordingly, a buffering burden of a receiving terminal may be reduced.

Figure 3:
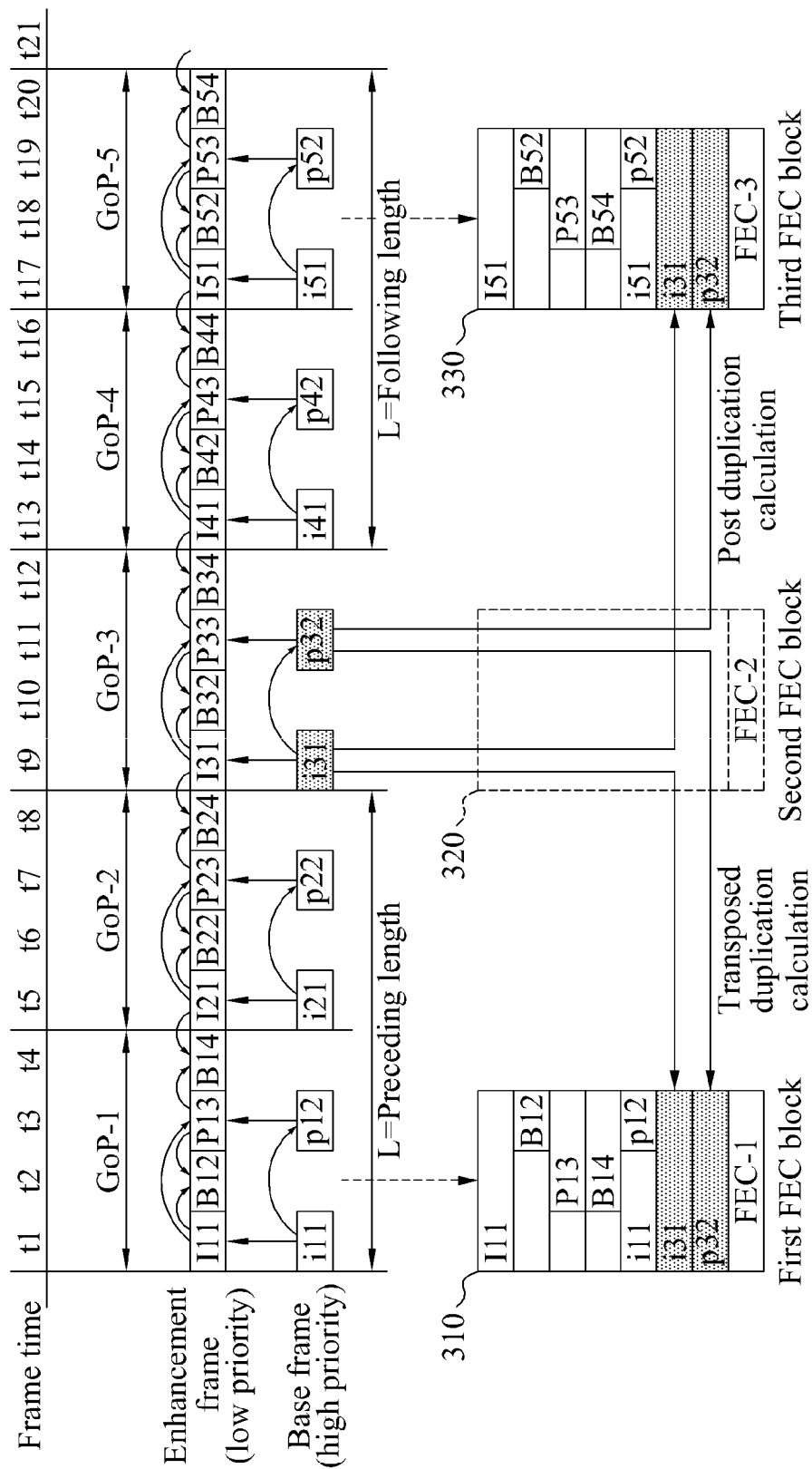
FIG. 3 is a timing diagram illustrating a forward encoding correction (FEC) block encoding method according to an embodiment of the present invention.

FIG. 3 is a timing diagram illustrating a FEC block encoding method according to an embodiment of the present invention.

A method of performing, by the FEC encoder 240 of the block coding encoding apparatus 200, FEC block encoding will be described using a logical timing diagram of FIG. 3.

The FEC encoder 240 may fetch data i11 and p12 from the low priority buffer 220 and fetch data I11, B12, P13, and B 14 from the high priority buffer 230 in a time interval of t1 to t4, and thereby configure a FEC source block for performing FEC block coding.

When the "transposed duplication calculation" is set, the FEC encoder 240 may fetch, from the high priority buffer 230, high importance data i31 and p32 of a time zone behind by L time, may add the fetched data to the FEC source block, and may perform the FEC encoding calculation.

Accordingly, when performing the block encoding calculation, i31 and p32 that are high importance data of the high priority buffer 230 may be duplicated and thereby be included in both a first FEC block 310 and a second FEC block 320.

When the "post duplication calculation" is set, the FEC encoder 240 may fetch data I51, B52, P53, B54, i51, and p52 in a time interval of t17 to t 20, and thereby configure a FEC source block. The FEC encoder 240 may fetch, from the high priority buffer 230, high importance data i31 and p32 of a time zone ahead by L time, may add the fetched data to the FEC source block, and may perform a FEC encoding calculation.

Accordingly, when performing the block encoding calculation, i31 and p32 that are high importance data of the high priority buffer 230 may be duplicated and thereby be included in both the first FEC block 310 and a third FEC block 330.

When both the "transposed duplication calculation" and the "transposed duplication calculation" are set, and when performing the block encoding calculation, i31 and p32 that are high importance data of the high priority buffer 320 may be duplicated and thereby be included in all of the first FEC block 310, the second FEC block 320, and the third FEC block 330. Therefore, when a data loss occurs, an opportunity capable of recovering the data loss in one of at least three FEC blocks may be further obtained.

Figure 4:
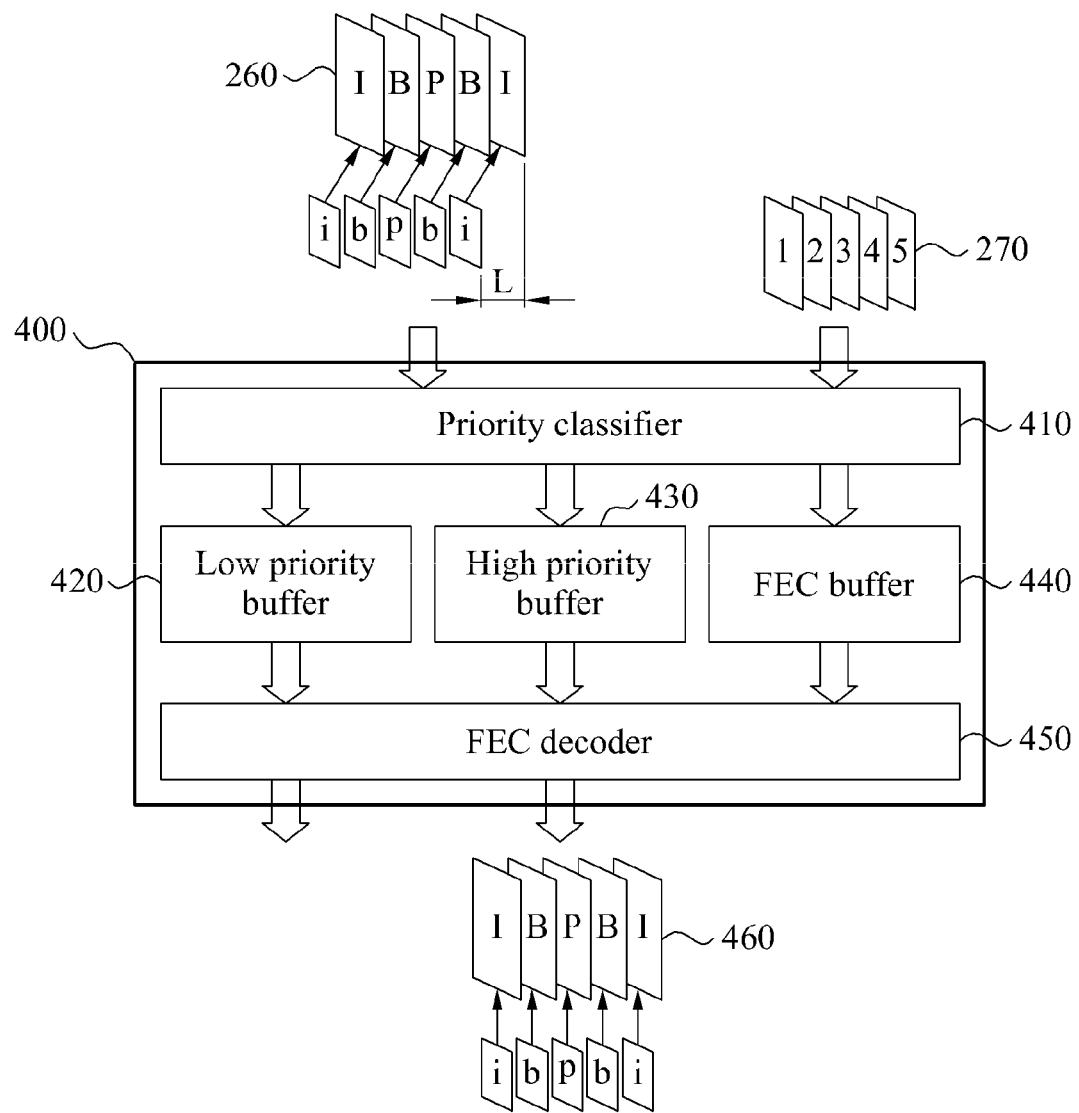
FIG. 4 is a diagram illustrating a configuration of a block coding decoding apparatus according to an embodiment of the present invention.

FIG. 4 is a diagram illustrating a configuration of a block coding decoding apparatus 400 according to an embodiment of the present invention.

The block coding decoding apparatus 400 may include a priority classifier 410, a low priority buffer 420, a high priority buffer 430, a FEC buffer 440, and a FEC decoder 450.

The priority classifier 410 may receive input data 260, that is, a data stream and FEC data 270 from an outside. An importance and a block identifier may be indicated in each of the input data 260 and the FEC data 270.

The priority classifier 410 may indicate time information in the data stream 260 and the FEC data 270. The priority classifier 410 may classify the data stream in which the time information is indicate, into the low priority buffer 420 and the high priority buffer 430 and thereby store the data stream, and may store, in the FEC buffer 440, the FEC data in which the time information is indicated. Data stored in the low priority buffer 420 may be low importance data and data stored in the high priority buffer 430 may be high importance data.

Data stored in the low priority buffer 420, the high priority buffer 430, and the FEC buffer 440 may be buffered for at least minimum of L time. That is, data of the low priority buffer 420, data of the high priority buffer 430, and data of the FEC buffer 440 may be buffered for the at least minimum of L time.

Interleaving may be applied to the FEC decoder 450 or the block coding decoding apparatus 400. Among data 260 input from the outside of the block coding decoding apparatus 400, low importance data may be delayed for at least L time compared to the high importance data and thereby be transmitted. In this example, since only the high importance data of the high priority buffer 430 is buffered for the at least L time, a buffering burden of a receiving terminal including or using the block coding decoding apparatus 400 may decrease.

The FEC decoder 450 may configure a FEC block based on data of the low priority buffer 420, data of the high priority buffer 430, and FEC data, and may perform decoding.

A decoding result may be output as stream data 460 by the FEC decoder 450.

When lost data is detected in input data, for example, data of the low priority buffer 420, data of the high priority buffer 430, FEC data, or the externally input data 260, the FEC decoder 450 may perform FEC decoding to thereby recover the lost data. The first time zone is a time zone corresponding to the lost data.

When loss of the input data is detected, the FEC decoder 450 may estimate a block identifier to be used for loss recovery using block identifier information and the like of lossless data, for example, lossless data of the first time zone among data of the low priority buffer 420, data of the high priority buffer 430, and FEC data.

When the block identifier is estimated, the FEC decoder 450 may fetch all of lossless data, that is, high importance data and low importance data corresponding to the estimated block identifier from the low priority buffer 420 and the high priority buffer 430, and fetch all of lossless FEC data corresponding to the estimated block identifier from the FEC buffer 440 and thereby configure a FEC block based on the fetched data and FED data, and may perform FEC decoding. The FEC decoder 450 may recover the lost data through the decoding.

When the FEC decoder 450 cannot recover the high importance data even through the aforementioned FEC decoding process, lost data may be recovered according to the following method.

The FEC decoder 450 may configure the FEC block by estimating the block identifier of a second time zone different from the first time zone, by fetching all of lossless data corresponding to the estimated block identifier from the low priority buffer 420 and the high priority buffer 430, and by fetching all of lossless FEC data corresponding to the estimated block identifier from the FEC buffer 440, and may recover the lost data by performing FEC decoding with respect to the FEC block.

The second time zone may be a time zone ahead of the first time zone by L time or a time zone behind the first time zone by the L time.

The second time zone may be a time zone ahead of the first time zone by the L time and a time zone behind the first time zone by the L time.

L may correspond to a maximum length that the block coding decoding apparatus 400 desires to recover data with a high importance from continuous burst loss.

When the block coding encoding apparatus 200 performs the post duplication calculation, the second time zone may be a time zone ahead of the first time zone by L time.

Therefore, the FEC decoder 450 may configure a FEC block by estimating a block identifier of a time zone ahead by L time, by fetching all of lossless data corresponding to the estimated block identifier from the low priority buffer 420 and the high priority data 430, and by fetching all of lossless FEC data corresponding to the estimated block identifier from the FEC buffer 440, and may perform decoding with respect to the configured FEC block. Through this, the FEC decoder 450 may recover lost high importance data.

When the block coding encoding apparatus 200 performs the transposed duplication calculation, the second time zone may be a time zone behind the first time zone by L time.

Therefore, the FEC decoder 450 may configure the FEC block by further buffering the data stream and the FEC data for the L time to thereby fetch a block identifier of input data, and by fetching all of lossless data and FEC data corresponding the fetched block identifier from the low priority buffer 420, the high priority buffer 430, and the FEC buffer 440, and may recover the lost data by performing decoding with respect to the FEC block.

According to the aforementioned method, the high importance data may have more opportunities to be recovered in one FEC block where data lost is least among at least two FEC blocks that are separate by at least L time. Accordingly, even though the continuous data loss occurs in a wired/wireless communication path, it is possible to provide a seamless real-time multimedia service with the minimum quality by increasing a recovery rate of high importance data.

Figure 5:
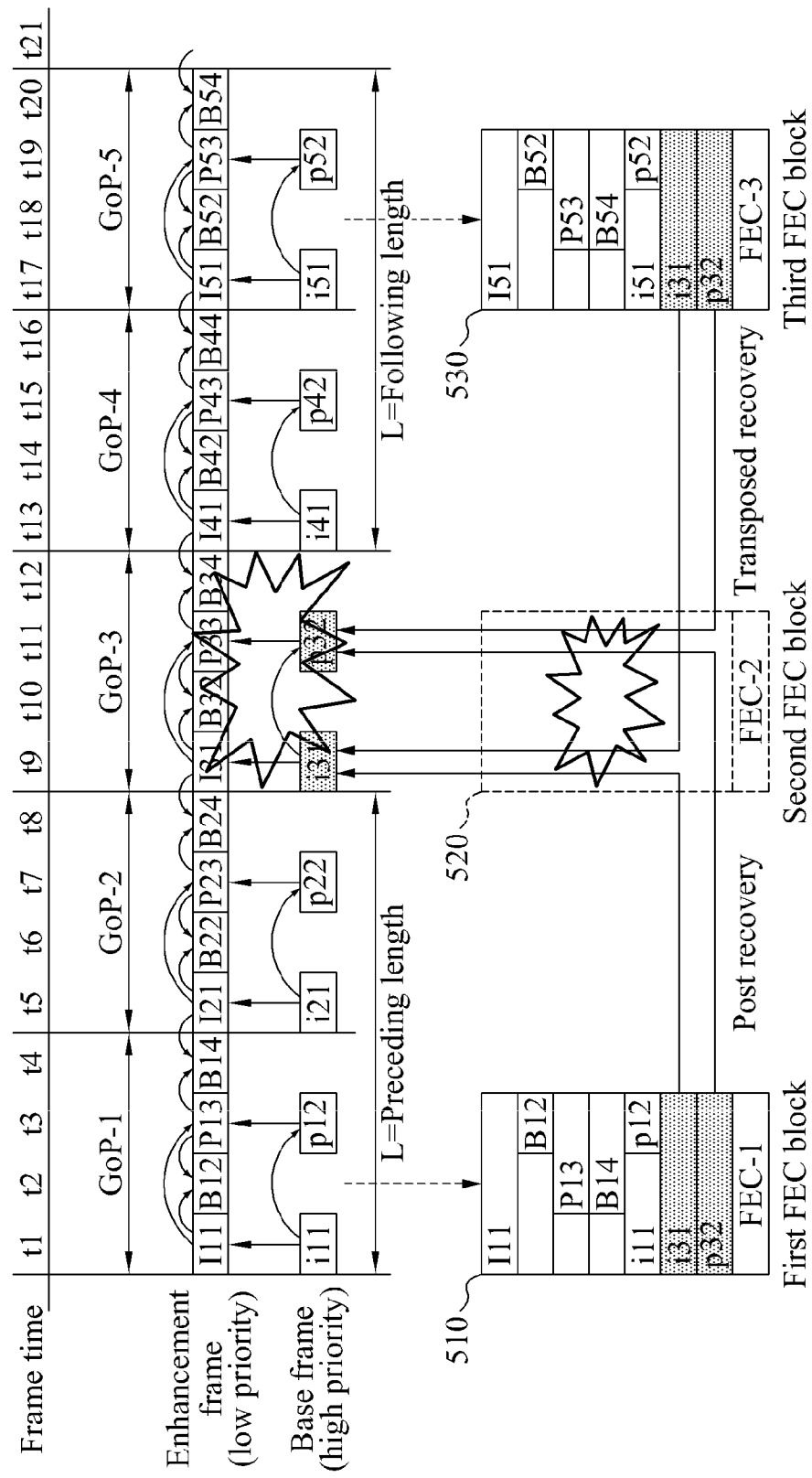
FIG. 5 is a timing diagram illustrating a FEC block decoding method according to an embodiment of the present invention.

FIG. 5 is a timing diagram illustrating a FEC block decoding method according to an embodiment of the present invention.

A method of performing, by the block coding decoding apparatus 400, recovering high importance data from continuous data loss having occurred in a time interval of t9 to t12 will be described using a logical timing diagram of FIG. 5.

In FIG. 5, the FEC decoder 450 has attempted loss recovery by detecting data loss of I31, B32, P33, B34, i32, and p32 having occurred in the time interval of t9 to t 12, and by configuring a second FEC block 520, however, has failed in data recovery due to a significantly large amount of loss.

When a post duplication calculation is performed in the block coding encoding apparatus 200, the FEC decoder 450 may configure a first FEC block 510 by estimating a FEC block identifier of a time zone ahead by L time, and by fetching I11, B12, P13, B14, i11, p12, and FEC-1 from the low priority buffer 420, the high priority buffer 430, and the FEC buffer 440, and may perform a FEC decoding calculation to thereby recover the lost high importance data i31 and p32.

When a transposed duplication calculation is performed in the block coding encoding apparatus 200, the FEC decoder 450 may configure a third FEC block 530 by further buffering the data stream 260 and the FEC data 270 for L time, and by fetching I51, B52, P53, B54, i51, p52, and FEC-3 from the low priority buffer 420, the high priority buffer 430, and the FEC buffer 440, and may perform the FEC decoding calculation to thereby recover the lost high importance data i31 and p32.

When a receiving terminal including or using the block coding decoding apparatus 400 may endure loss of input data continuous by L time, an amount of data to be buffered by the receiving terminal may increase according to an increase in L. Therefore, as L increases, a buffering burden of the receiving terminal may increase. However, even though the buffering burden of the receiving terminal increases, an amount of parity data to be used for loss recovery may not increase. Accordingly, a transmission bitrate to the receiving terminal may not increase.

Figure 6:
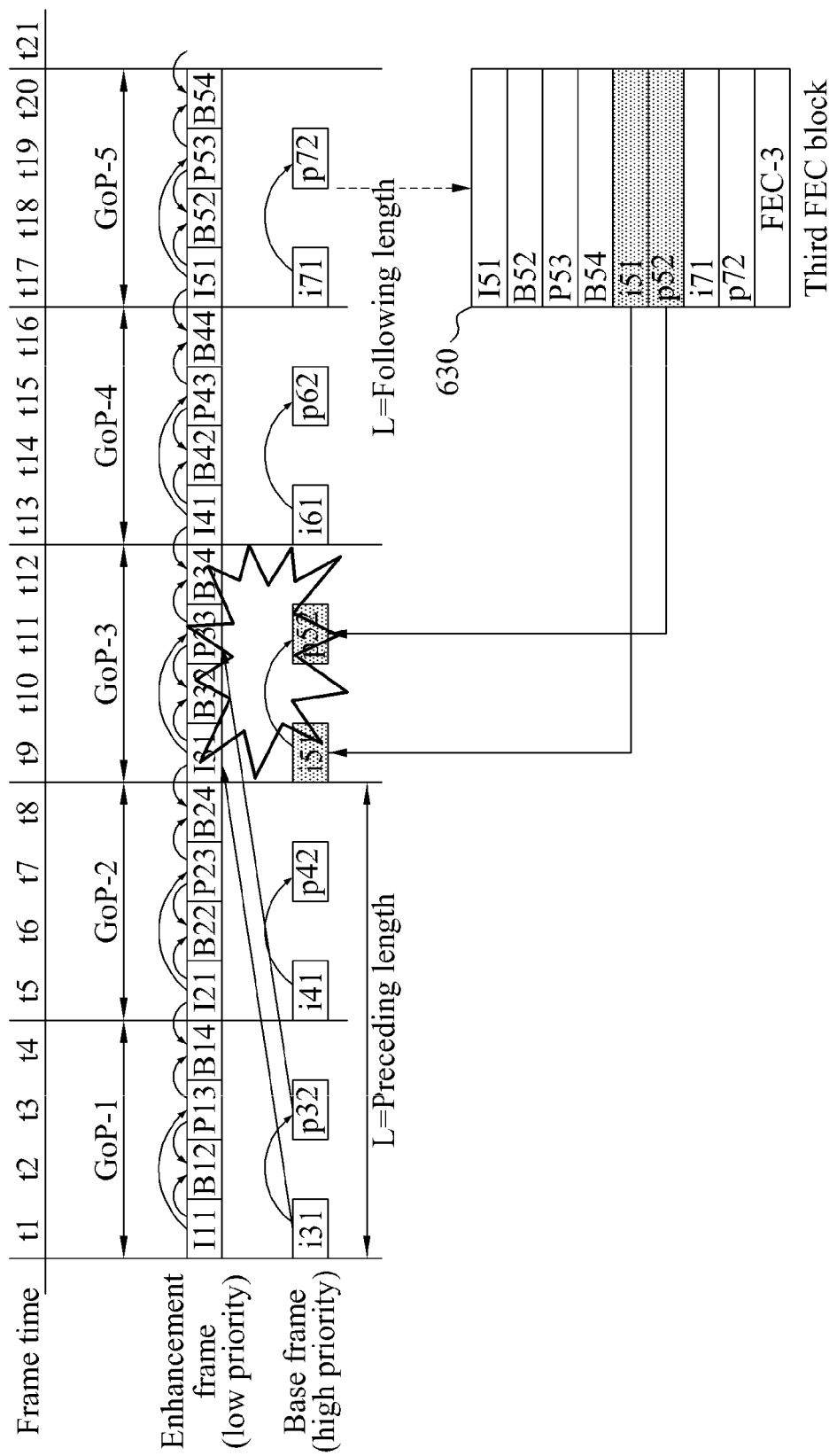
FIG. 6 is a timing diagram illustrating a FEC block decoding method applying interleaving according to an embodiment of the present invention.

FIG. 6 is a timing diagram illustrating a FEC block decoding method applying interleaving according to an embodiment of the present invention.

An interleaving method may be applied to the block coding encoding apparatus 200. That is, the block coding encoding apparatus 200 may delay low importance data by L time compared to high importance data and thereby transmit the data.

When the interleaving method is applied, the block coding decoding apparatus 400 may decrease a buffering burden and recover high importance data from continuous data loss.

The block coding decoding apparatus 400 may decrease the overall buffering burden by buffering only data stored in the high priority buffer 420 for at least L time.

When the FEC decoder 450 detects data loss having occurred in the time interval of t9 to t12, the FEC decoder 450 may fetch only data i31 and p32 that is pre-stored in the high priority buffer 430, and thereby use the fetched data for media playback. Accordingly, a streaming service with the minimum quality may be provided.

In a time interval of t13 to t16, the FEC decoder 450 may decode pre-stored data i41 and p42 and newly received data I41, B42, P43, and B44 in time, and thereby use the decoded data for media playback with the normal quality.

In a time interval of t17 to t20, the FEC decoder 450 may configure a third FEC block 630 using received data I51, B52, P53, B54, i71, p72, and FEC-3, and perform a FEC decoding calculation, thereby recovering i51 and p52 corresponding to lost high importance data. The FEC decoder 450 may decode the recovered data i51 and p52 and use i51 and p52 for media playback with the normal quality.

Figure 7:
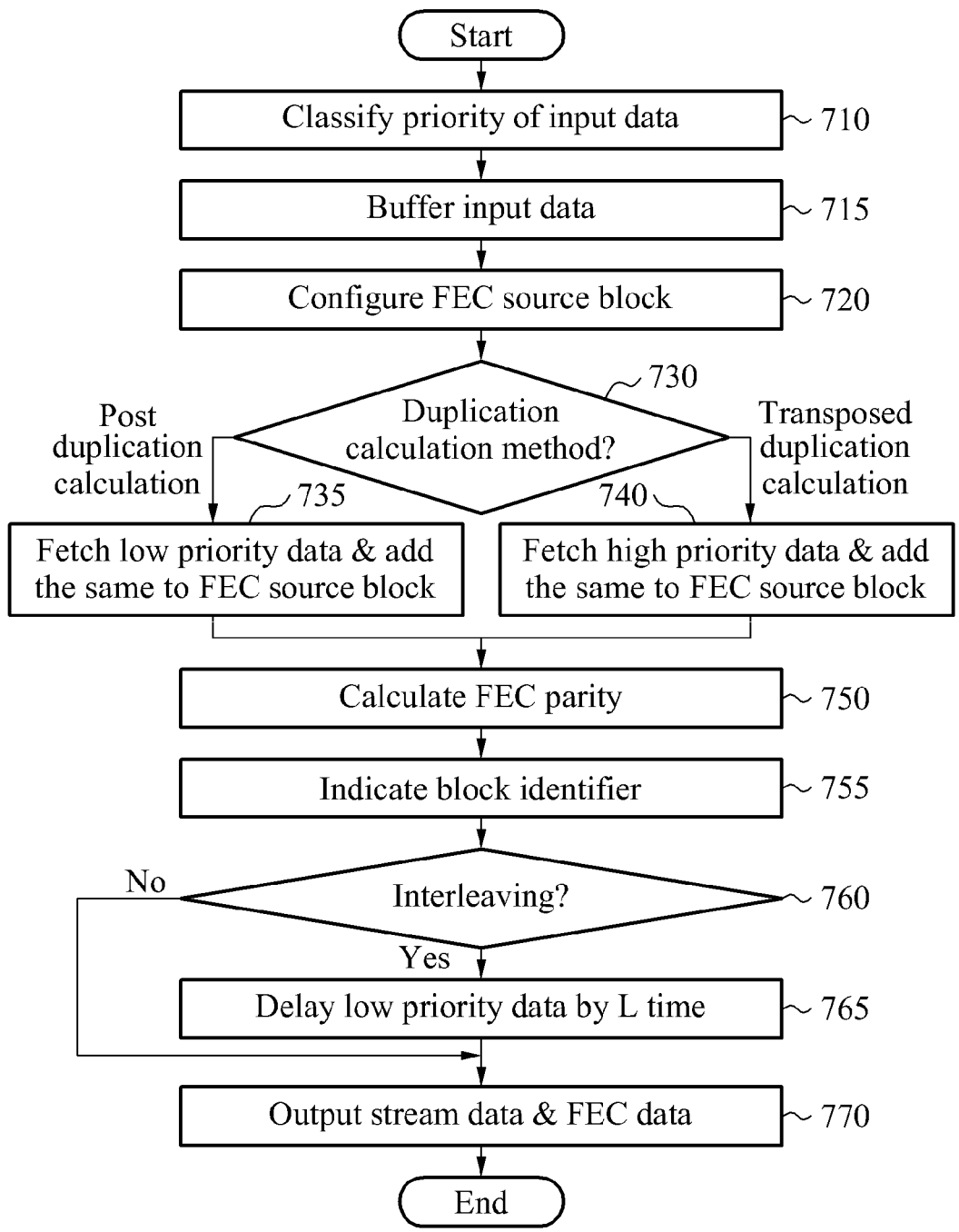
FIG. 7 is a flowchart to describe an operation of the block coding encoding apparatus of FIG. 2 according to an embodiment of the present invention.

FIG. 7 is a flowchart to describe an operation of the block coding encoding apparatus 200 of FIG. 2 according to an embodiment of the present invention.

In operation 710, data, for example, the data stream 250 in which the importance is indicated may be input. Time information may be indicated in the input data and a priority of the input data may be classified.

In operation 715, the input data may be buffered. That is, the data stream in which the time information is indicated may be classified into the low priority buffer 220 and the high priority buffer 230 based on the importance and thereby be stored.

In operation 720, a FEC source block may be configured. Data of a predetermined time zone may be fetched from the low priority buffer 220 and the high priority buffer 230. The FEC source block may be configured based on the fetched data.

In operation 730, a duplication calculation method may be selected.

When a post duplication calculation is selected in operation 730, high importance data ahead of the predetermined time zone by L time may be fetched from the high priority buffer 230 and be added to the FEC source block in operation 735.

When a transposed duplication calculation is selected in operation 730, high importance data, that is, high priority data behind the predetermined time zone by L time may be fetched from the high priority buffer 230 and be added to the FEC source block in operation 740.

In operation 750, FEC parity may be calculated with respect to the FEC source block.

In operation 755, a block identifier may be indicated in FEC data and data constituting the FEC source block.

In operation 760, whether to apply interleaving may be determined.

When interleaving is determined to be applied, low importance data, that is, low priority data may be delayed by L time in operation 765.

In operation 765, stream data, for example, the output data 260 and the FEC data, for example, the FEC parity data 270 in which the block identifier is indicted may be output.

Description made above with reference to FIG. 1 through FIG. 6 will be applicable to the present embodiment as is and thus, further detailed description will be omitted here.

Figure 8:
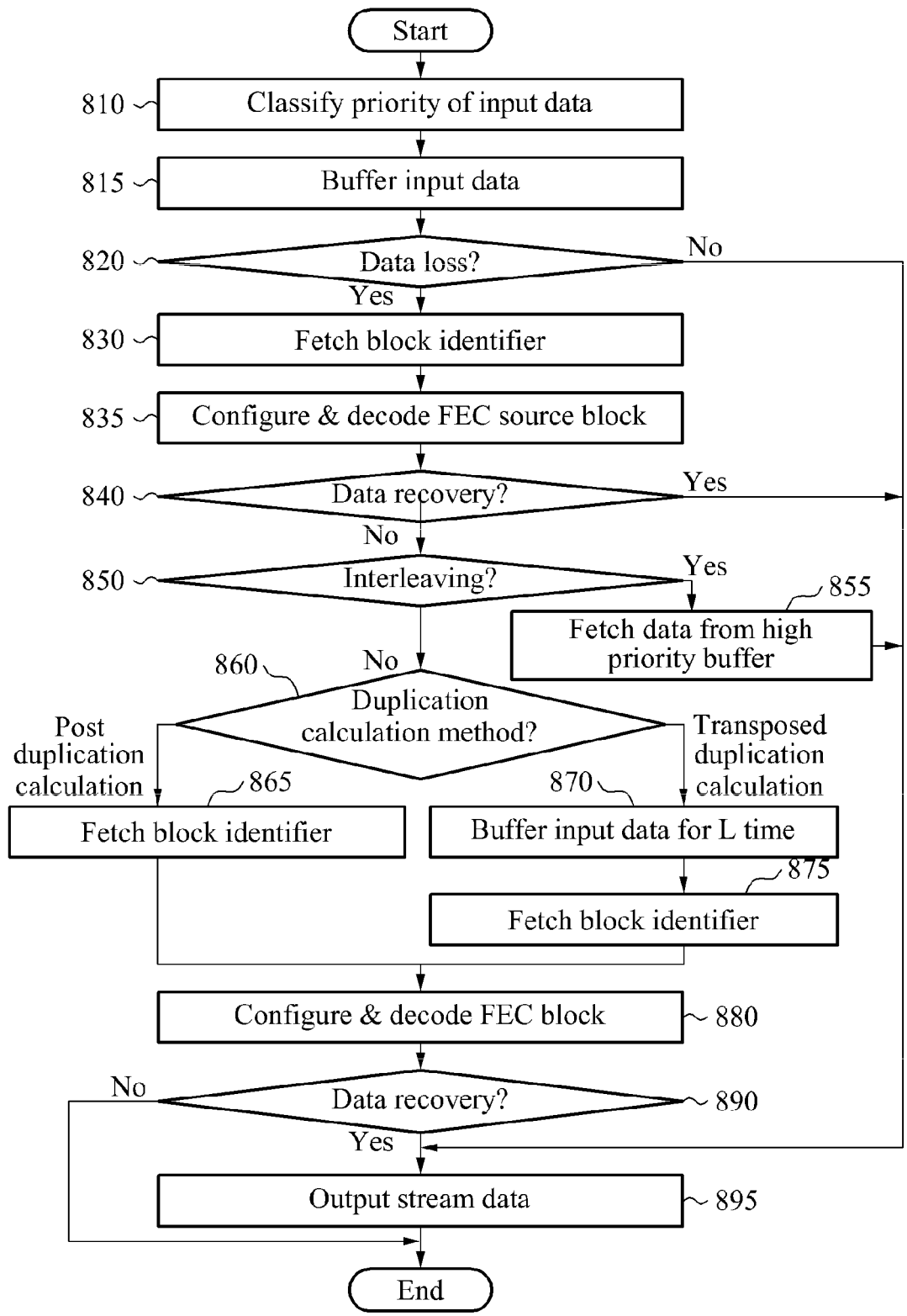
FIG. 8 is a flowchart to describe an operation of the block coding decoding apparatus of FIG. 4 according to an embodiment of the present invention.

FIG. 8 is a flowchart to describe an operation of the block coding decoding apparatus 400 of FIG. 4 according to an embodiment of the present invention.

In operation 810, the data stream 260 and the FEC parity data 270 in which an importance and a block identifier is indicated may be received as input data. Also, a priority of the input data may be classified.

Time information may be indicated in the data stream 260 and the FEC data 270.

In operation 815, the input data may be buffered. That is, the data stream 260 may be classified into the low priority buffer 420 and the high priority buffer 430 and thereby be stored. The FEC data may be stored in the FEC buffer 440.

In operation 820, whether data is lost may be detected. When data loss is not detected, operation 895 may be performed. When the data loss is detected, operation 830 may be performed.

In operation 830, a first block identifier may be fetched.

In operation 835, a FEC source block may be configured and be decoded. That is, the FEC block may be configured based on data of the low priority buffer 420, data of the high priority buffer 430, and FEC data. A FEC decoding calculation may be performed with respect to the configured FEC block.

In operation 840, whether data recovery is required may be determined.

When the FEC decoding calculation can be performed with respect to the FEC block, operation 895 may be performed. When the data recovery is required, operation 850 may be performed.

In operation 850, whether to apply interleaving may be determined.

When interleaving is determined to be applied, data may be fetched from the high priority buffer 430 in operation 855 and operation 895 may be performed.

On the contrary, when interleaving is determined to not be applied, operation 860 may be performed.

In operation 860, a duplication calculation method may be selected. When a post duplication calculation is performed, operation 865 may be performed. When a transpose duplication calculation is performed, operation 870 may be performed.

In operation 865, a second block identifier ahead of the first block identifier of operation 830 by L time may be fetched.

In operation 870, the input data 260 and 270 may be buffered for L time.

In operation 875, the second block identifier may be fetched.

In operation 880, the FEC block may be configured by fetching data corresponding to the second block identifier from the low priority buffer 420, the high priority buffer 430, and the FEC buffer 440. A FEC decoding calculation may be performed with respect to the FEC block.

In operation 890, whether data is recovered may be determined.

When the data is recovered, operation 895 may be performed and otherwise, a procedure may be terminated.

In operation 895, stream data 460 may be performed.

Description made above with reference to FIG. 1 through FIG. 7 will be applicable to the present embodiment as is and thus, further detailed description will be omitted here.

According to the aforementioned block coding encoding apparatus 200 and block coding decoding apparatus 400, when continuous data loss occurs in a wired/wireless transmission path, high importance data may be reliably recovered and a seamless service with the minimum quality may be provided.

As one example, when the data stream 260 input into the block coding decoding apparatus 400 from an outside is a hierarchically separated SVC stream, base frame data having a high importance may be applied to a transpose duplication calculation or a post duplication calculation. Through this, even though continuous data loss occurs, a seamless service with the minimum quality may continue by recovering a base frame.

As another example, when the data stream 260 input into the block coding decoding apparatus 400 from an outside is a multimedia stream in which a voice and an image are mixed, voice data having a high importance may be applied to a transpose duplication calculation or a post duplication calculation. Through this, even though continuous data loss occurs, a seamless voice service with the minimum quality may continue by recovering the voice data.

In the case of a 3D stream in which an image is divided into a left image and a right image, image data of one side having a high importance may be at least seamlessly played back.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An encoding apparatus comprising:
a low priority buffer;
a high priority buffer;
a priority classifier to receive a data stream in which an importance is indicated, to indicate time information in the data stream, and to classify the data stream into the low priority buffer and the high priority buffer based on the importance and thereby store the data stream; and
a forward error collection (FEC) encoder to perform an encoding calculation for FEC parity data generation by fetching data of the same first time zone from each of the low priority buffer and the high priority buffer to thereby configure a FEC source block, and by fetching, from the high priority buffer, data of a second time zone different from the first time zone to thereby add the fetched data to the FEC source block.

2. The encoding apparatus of claim 1, wherein the second time zone is a time zone ahead of the first time zone by an L time or a time zone behind the first time zone by the L time.

3. The encoding apparatus of claim 2, wherein L corresponds to a maximum length of high importance data to be recovered from continuous burst loss.

4. The encoding apparatus of claim 2, wherein data of the low priority buffer and the high priority buffer is buffered for a minimum of the L time.

5. The encoding apparatus of claim 2, wherein the second time zone is a time zone ahead of the first time zone by the L time and a time zone behind the first time zone by the L time.

6. The encoding apparatus of claim 2, wherein the FEC encoder delays data of the low priority buffer by the L time compared to data of the high priority buffer and thereby transmits the delayed data.

7. The encoding apparatus of claim 6, wherein the FEC encoder sequentially outputs the output data and FEC parity data in which a block identifier is indicated.

8. The encoding apparatus of claim 1, wherein:
the FEC encoder indicates a block identifier in output data constituting a block and FEC parity data, and
data that is duplicated and added to at least two blocks and has a high importance within the high priority buffer is indicated using at least two block identifiers.

9. The encoding apparatus of claim 1, wherein the data stream is a scalable video coding stream, data of the high priority buffer is base frame data, and data of the low priority buffer is enhancement frame data.

10. A decoding apparatus comprising:
a low priority buffer;
a high priority buffer;
a FEC buffer;
a priority classifier to receive FEC data and a data stream in which an importance and a block identifier are indicated, to indicate time information in the data stream and the FEC data, to classify the data stream into the high priority buffer and the low priority buffer and thereby store the data stream, and to store the FEC data in the FEC buffer; and
a FEC decoder to configure a FEC block and perform decoding based on data of the low priority buffer, data of the high priority buffer, and the FEC data,
wherein when lost data of a first time zone is detected, the FEC decoder configures the FEC block by estimating the block identifier to be used for loss recovery using block identifier information of lossless data of the first time zone, by fetching all of lossless data corresponding to the estimated block identifier from the low priority buffer and the high priority buffer, and by fetching all of lossless FEC data corresponding to the estimated block identifier from the FEC buffer, and performs FEC decoding by performing a FEC decoding calculation with respect to the FEC block.

11. The decoding apparatus of claim 10, wherein:
the FEC decoder configures the FEC block by estimating the block identifier of a second time zone different from the first time zone, by fetching all of lossless data corresponding to the estimated block identifier from the low priority buffer and the high priority buffer, and by fetching all of lossless FEC data corresponding to the estimated block identifier from the FEC buffer, and recovers the lost data by performing FEC decoding with respect to the FEC block.

12. The decoding apparatus of claim 11, wherein the second time zone is a time zone ahead of the first time zone by an L time or a time zone behind the first time zone by the L time.

13. The decoding apparatus of claim 12, wherein L corresponds to a maximum length that the decoding apparatus desires to recover high importance data from continuous burst loss.

14. The decoding apparatus of claim 12, wherein:
data of the low priority buffer and the high priority buffer is buffered for at least minimum of the L time, and
the FEC data of the FEC buffer is buffered for the at least minimum of the L time.

15. The decoding apparatus of claim 14, wherein the FEC decoder configures the FEC block by further buffering the data stream and the FEC data for the L time to thereby fetch a block identifier of input data, and by fetching all of lossless data and FEC data corresponding to the fetched block identifier from the low priority buffer, the high priority buffer, and the FEC buffer, and recovers the lost data by performing decoding with respect to the FEC block.

16. The decoding apparatus of claim 12, wherein:
low importance data that is stored in the low priority buffer is delayed by at least the L time compared to high importance data that is stored in the high priority buffer and thereby is transmitted, and
data of the high priority buffer is buffered for at least the L time.

17. The decoding apparatus of claim 11, wherein the second time zone is a time zone ahead of the first time zone by the L time and a time zone behind the first time zone by the L time.

18. An encoding method comprising:
receiving a data stream in which an importance is indicated;
indicating time information in the data stream;
classifying the data stream in which the time information is indicated into a low priority buffer and a high priority buffer based on the importance to thereby store the data stream;
configuring a FEC source block by fetching data of a predetermined time zone from the low priority buffer and the high priority buffer;
fetching, from the high priority buffer, data ahead of or behind the predetermined time zone by an L time to thereby add the fetched data to the FEC source block;
calculating FEC parity data of the FEC source block; and
outputting the FEC source block and the FEC parity data.

19. A decoding method comprising:
receiving FEC data and a data stream in which an importance and a block identifier are indicated;
storing the data stream by classifying the data stream into a low priority buffer and a high priority buffer, and storing the FEC data in a FEC buffer;
configuring a FEC block based on data of the low priority buffer and the high priority buffer and the FEC data;
configuring the FEC block by fetching L-time ahead data or L-time behind data from the low priority buffer, the high priority buffer, and the FEC buffer; and
performing a FEC decoding calculation with respect to the FEC block.

* * * * *